(12) United States Patent  
Ozawa

(10) Patent No.: US 9,710,029 B2
(45) Date of Patent: Jul. 18, 2017

(54) MECHANISM FOR SENDING AIR IN APPARATUS FOR READING IMAGES AND APPARATUS FOR READING IMAGES

(71) Applicants: RISO KAGAKU CORPORATION, Tokyo (JP); NISCA CORPORATION, Minamikoma-gun, Yamanashi-ken (JP)

(72) Inventor: Junya Ozawa, Yamanashi-ken (JP)

(73) Assignees: RISO KAGAKU CORPORATION, Tokyo (JP); NISCA CORPORATION, Minamikoma-gun, Yamanashi-ken (JP)

( * ) Notice: Subject to any disclaimer, the term of this patent is extended or adjusted under 35 U.S.C. 154(b) by 29 days.

(21) Appl. No.: 14/970,766

(22) Filed: Dec. 16, 2015

(65) Prior Publication Data

US 2016/0187942 A1    Jun. 30, 2016

(30) Foreign Application Priority Data

Dec. 25, 2014  (JP) ................................ 2014-262018

(51) Int. Cl.
  *G06F 1/20*  (2006.01)
  *H04N 1/00*  (2006.01)
(52) U.S. Cl.
  CPC ........... *G06F 1/20* (2013.01); *H04N 1/00519* (2013.01)
(58) Field of Classification Search
  CPC ............. H04N 1/00519; H04N 9/3144; G03G 21/206; G06F 1/20; G06F 1/203
  See application file for complete search history.

(56) References Cited

U.S. PATENT DOCUMENTS

| 6,115,147 A * | 9/2000 | Mizumoto ............. H04N 1/192 358/483 |
| 2002/0173265 A1* | 11/2002 | Kipka .................. H05K 9/0041 454/184 |
| 2004/0228646 A1* | 11/2004 | Sekiguchi ............ G03G 21/206 399/92 |
| 2005/0129424 A1* | 6/2005 | Park ..................... G03G 21/206 399/93 |
| 2006/0193013 A1* | 8/2006 | Hoshi ................ H04N 1/00708 358/474 |

(Continued)

FOREIGN PATENT DOCUMENTS

| JP | H10-20413 A | 1/1998 |
| JP | H11-272146 A | 10/1999 |

(Continued)

*Primary Examiner* — David M Sinclair
*Assistant Examiner* — Robert Brown
(74) *Attorney, Agent, or Firm* — Manabu Kanesaka

(57) ABSTRACT

In a blast mechanism for optimizing an air blast in the main scanning direction and an air blast in the sub-scanning direction so as not to affect reading accuracy of an image, a first blast path for sending air in the main scanning direction and a second blast path for sending air in the sub-scanning direction are formed inside the housing, and collection efficiencies of air filters of the blast paths are set so that the efficiency in the main scanning direction is high than that in the sub-scanning direction. The blast mechanism includes a casing, first and second blast paths in the main and sub-scanning directions disposed in the casing, and air filters disposed in the respective blast paths. The dust collection efficiencies of the air filters are set so that the filter of the first blast path is higher than the filter of the second blast path.

10 Claims, 8 Drawing Sheets

(56) References Cited

U.S. PATENT DOCUMENTS

| | | | | |
|---|---|---|---|---|
| 2008/0019092 A1* | 1/2008 | Chen | G06F 1/20 | 361/695 |
| 2011/0222897 A1* | 9/2011 | Makino | G03G 15/0258 | 399/92 |
| 2012/0243899 A1* | 9/2012 | Ryuzaki | G03G 21/206 | 399/92 |
| 2013/0101311 A1* | 4/2013 | Otsuka | G03G 21/206 | 399/93 |
| 2013/0108309 A1* | 5/2013 | Yamanaka | G03G 21/206 | 399/92 |
| 2013/0165036 A1* | 6/2013 | Kudo | G03G 15/0291 | 454/284 |
| 2013/0314756 A1* | 11/2013 | Amemiya | F21V 13/04 | 358/497 |
| 2014/0111835 A1* | 4/2014 | Ozawa | H04N 1/028 | 358/475 |
| 2014/0334100 A1* | 11/2014 | Yoon | H05K 7/20145 | 361/692 |
| 2014/0376950 A1* | 12/2014 | Hara | G03G 21/206 | 399/92 |
| 2015/0153710 A1* | 6/2015 | Otsuka | G03G 21/206 | 399/93 |
| 2016/0059173 A1* | 3/2016 | Kuroda | B01D 46/10 | 399/93 |

FOREIGN PATENT DOCUMENTS

| | | |
|---|---|---|
| JP | 2004-246134 A | 9/2004 |
| JP | 2008-160577 A | 7/2008 |

* cited by examiner

MECHANISM FOR SENDING AIR IN APPARATUS FOR READING IMAGES AND APPARATUS FOR READING IMAGES

TECHNICAL FIELD

The present invention relates to a blast mechanism of cooling air in an image reading apparatus, and more preferably, to improvements in the blast mechanism for efficiently sending cooling air from a vent hole formed in a casing.

BACKGROUND ART

Generally, in this type of apparatus, an air vent is formed in an external wall of a casing, and atmospheric air sucked from the outside is used to cool the inside of the apparatus, and then, is discharged. It is known that blast paths inside the apparatus efficiently cool the periphery of alight source lamp, the periphery of a power supply board and the like becoming high temperatures, and the periphery of a photo-electric converter susceptible to heat.

For example, Patent Document 1 proposes a mechanism for arranging an air vent and blast fan in a part of a casing and supplying cooling air to inside the casing. In the Document, the direction of a blast path is disposed in a main scanning direction of a carriage for reciprocating. Further, Patent Document 2 also proposes a similar blast path structure.

It is also proposed in Patent Document 3, Patent Document 4 and the like that an air filter is disposed in the blast path in the cooling mechanism for thus sucking atmospheric air from the outside.

PRIOR ART DOCUMENT

Patent Document

[Patent Document 1] Japanese Patent Application Publication No. 2004-246134
[Patent Document 2] Japanese Patent Application Publication No. H11-272146
[Patent Document 3] Japanese Patent Application Publication No. H10-20413
[Patent Document 4] Japanese Patent Application Publication No. 2008-160577

DISCLOSURE OF INVENTION

Problems to be Solved by the Invention

As described above, in an image reading apparatus, it is known that cooling air is sucked into the casing from the outside, and that dust removal is also performed with a filter in sucking outside air.

However, conventionally, it has only been attempted that outside air is sucked from outside the casing to cool internal temperatures uniformly. For example, in the apparatus of Patent Document 1, the blast fan is disposed to form the blast path in the scanning direction (sub-scanning direction) of the reading carriage. Further, in the apparatus of Patent Document 2, the blast path is provided in the main scanning direction of the reading carriage. Accordingly, conventional apparatuses have not proposed a mechanism for efficiently forming an air blast in the main scanning direction and an air blast in the sub-scanning direction.

It is an object of the present invention to provide a blast mechanism for optimizing an air blast in the main scanning direction and an air blast in the sub-scanning direction so as not to affect reading accuracy of an image.

Means for Solving the Problem

To attain the above-mentioned object, in the present invention, a first blast path for sending air in the main scanning direction and a second blast path for sending air in the sub-scanning direction are formed inside the housing, and collection efficiencies of air filters of the blast paths are set so that the efficiency in the main scanning direction is high and that the efficiency in the sub-scanning direction is low.

The invention of claim 1 is of a blast mechanism for sending cooling air to inside a casing of an apparatus for reading images in a line sequential manner, and the mechanism is provided with a casing, first blast path (30) in the main scanning direction disposed in the casing, second blast path (40) disposed in the sub-scanning direction, and air filters (32, 42) disposed in respective blast paths. The dust collection efficiencies of the air filters are set so that the filter of the first blast path is higher than the filter of the second blast path.

By this means, for example, the filter with high collection efficiency is disposed in the main scanning direction in which an image reading section including reading optical paths, photoelectric converter and the like is disposed, the filter with low collection efficiency is disposed in the sub-scanning direction that is relatively not affected by dust, and it is possible to suppress upsizing of the drive section, and reduce increases in power, increases in noise, vibration and the like.

In the invention of claim 2, the air filter of the first blast path is set for denser mesh roughness or a higher filtering volume than in the air filter of the second blast path.

By this means, it is possible to increase or decrease a collection amount by adjusting roughness or a volume with filter materials of the same configuration.

In the invention of claim 3, a regulation aperture for a blast volume is provided in each of the first blast path and the second blast path, and the regulation aperture (7) of the first blast path is set for a higher blast volume than in the regulation aperture (8) of the second blast path.

By this means, cooling air of high capacity is sent in the main scanning direction, cooling air of low capacity is sent in the sub-scanning direction, and it is possible to reliably obtain the effect of cooling the light source lamp and the like disposed in the main scanning direction.

The invention of claim 4 is to adopt either individual blast fans or a common blast fan to send air to the first and second blast paths. By this means, it is possible to adopt a layout configuration corresponding to the apparatus configuration.

In the invention of claim 5, the casing is configured in the shape of a box with external walls, a top and a bottom plate, and inside the casing is provided a barrier wall to partition into a carriage travel area and a board placement area. Then, the first blast path is disposed between an air inlet formed in the external wall and the carriage travel area, and the second blast path is disposed between an air inlet formed in the external wall and the board placement area.

By this means, the inside of the casing is partitioned into the area in which the carriage travels and the area for storing boards with the barrier wall, the first blast path sends outside air to the carriage travel area, and the second blast path sends outside air to the board placement area. Accordingly, it is possible to adjust volumes of outside air to send to both areas and inclusion dust removal efficiencies individually.

In the invention of claim 6, in the carriage travel area is disposed a reading carriage movable in the sub-scanning direction, and on the reading carriage are mounted a light source lamp, reflecting mirrors and condenser lens. By this means, cooling air with dust removed is sent to an imaging optical system of mirrors, lens and the like, and therefore, an image to read is not affected.

In the invention of claim 7, in the board placement area is disposed a control board for controlling the light source lamp of the reading carriage. By this means, the cooling effect is attained on the control board (with a low heating value as compared with the light source lamp and the like in the main scanning direction) by cooling air with low collection efficiency of dust and a low air volume.

In the invention of claim 8, the regulation aperture of the first blast path and the regulation aperture of the second blast path are disposed to be adjacent to each other in a wall surface of the apparatus casing in the invention of claim 3. By this means, it is possible to integrally form the air inlet in the external wall of the box-shaped casing, and also set the aperture amount by integral forming with the exterior casing.

The invention of claim 9 is to provide the blast mechanism as described in any one of the above-mentioned claims, and is to further provide a casing, a platen, an open/close unit for covering the platen, and a hinge unit of the open/close unit disposed in the casing. Then, a part of the first blast path is comprised of an air vent formed in an attachment member of the hinge unit.

By this means, it is possible to simplify the structure by forming the blast path with the attachment section (bracket or the like) to attach the hinge unit.

In the invention of claim 10, in the configuration of claim 9, the open/close unit is a feeder apparatus for feeding an original document sheet as a reading document to the platen, and the attachment section of the hinge unit is comprised of a bracket member attached to the casing. By this means, it is possible to form the blast path with the attachment bracket of the open/close hinge of the feeder apparatus.

Advantageous Effect of the Invention

The present invention is to decrease an included dust amount in cooling air in the main scanning direction, as compared with cooling air in the sub-scanning direction, and therefore, exhibits the following effects.

The filter with high collection efficiency is disposed in the main scanning direction in which an image reading section including reading optical paths, photoelectric converter and the like is generally disposed, the filter with low collection efficiency is disposed in the sub-scanning direction that is relatively not affected by dust, and it is possible to suppress upsizing of the drive mechanism, and reduce increases in power, increases in noise, vibration and the like.

Even when the imaging optical system including mirrors, lens and the like and the image reading section including the photoelectric converter and the like are disposed in the main scanning direction, dust of cooling air is removed by the filter with high collection efficiency, and therefore, there is not any problem with deterioration of images caused by adherence of dust.

Concurrently therewith, air is sent in the sub-scanning direction by the filter with relatively low collection efficiency, and therefore, it is possible to reduce the load imposed on the blast fan.

BEST MODE FOR CARRYING OUT THE INVENTION

Figure 1:
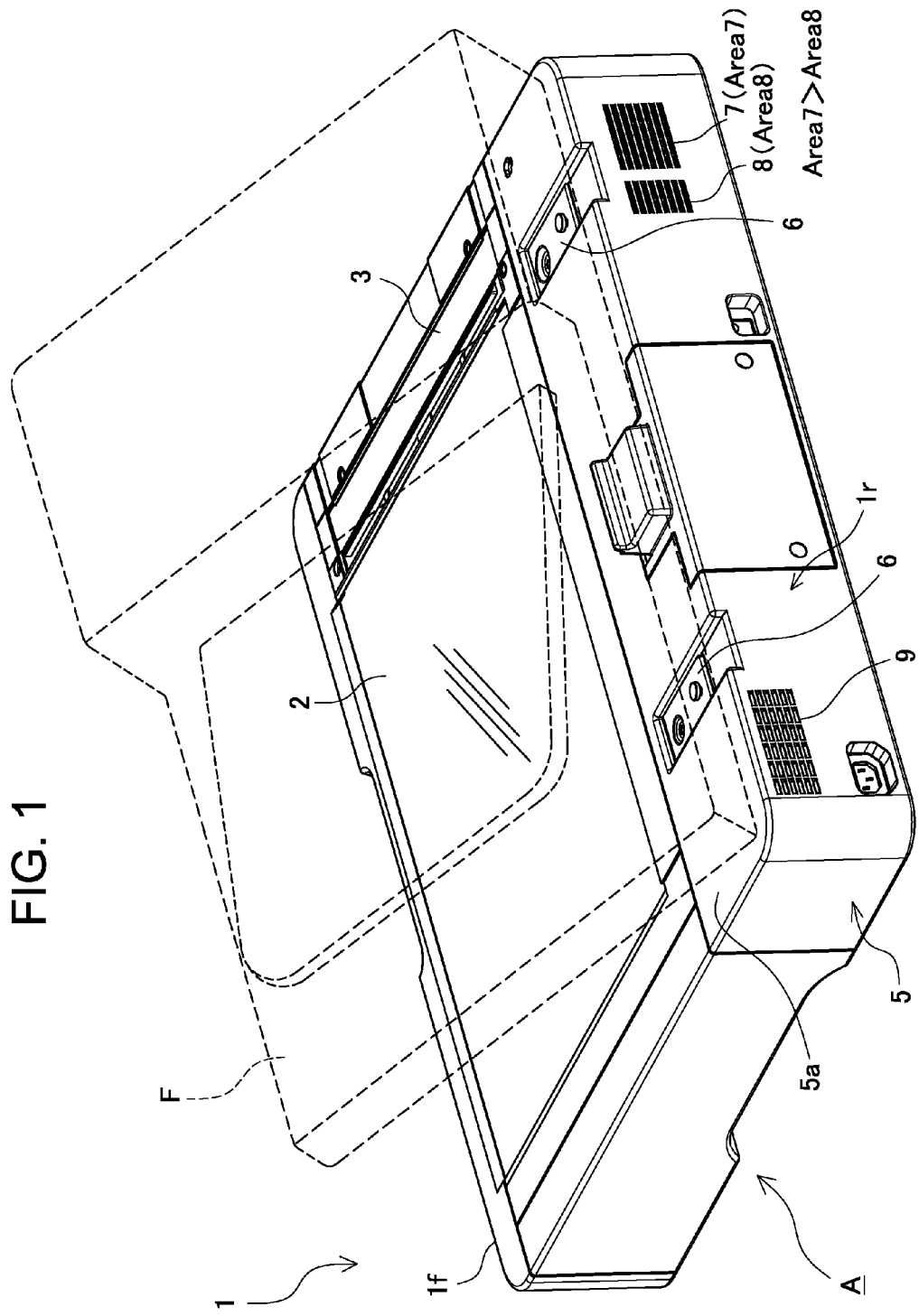
FIG. 1 is a perspective view illustrating the entire configuration of an image reading apparatus according to the present invention.

The present invention will specifically be described below according to Embodiments shown in drawings. FIG. 1 is an appearance explanatory view of an image reading apparatus A according to the present invention, and is comprised of a casing 1, main platen 2, sub-platen 3 and feeder unit F.

In the casing 1 are disposed the above-mentioned main platen 2, sub-platen 3 and board storage section 5. In the board storage section 5 are disposed various kinds of boards described later, and the section 5 is provided with a hinge attachment section 6 of the feeder unit F. "5a" shown in the figure denotes a top of the casing 1 positioned in the board storage section 5, "7" shown in the figure denotes a first air vent formed in the casing, "8" shown in the figure denotes a second air vent, and "9" shown in the figure denotes an air outlet.

Each of the board storage section 5, first and second air vents 7, 8 and air outlet 9 shown in the figure is formed on a side wall surface 1r on the rear side of the casing 1. The air vent 7 (8) and the air outlet 9 are disposed at a distance in opposite end portions of the rear side wall surface 1r.

[Casing Structure]

As the casing structure, the casing 1 is formed in the shape of a box with exterior side walls (front-side external wall 1f, rear-side side wall 1r, right-side wall 1s and left-side wall 1n), top (5a, main platen 2), and bottom plate Bs. The inside of the casing 1 is provided with a barrier wall 23, and is partitioned into a carriage travel area Cr, and board placement area Br with the barrier wall 23.

The barrier wall 23 shown in the figure forms a partition wall in the sub-scanning direction to divide the inside of the apparatus into two. Further, the carriage travel area Cr is disposed on the apparatus front side, and the board placement area Br is disposed on the apparatus rear side. This is because of enabling operation for setting an original document image on the main platen 2 disposed in the carriage travel area Cr to be performed easily from the apparatus front side.

On the barrier wall 23, guide rails (forming a part of a guide member 22 described later) are integrally formed to guide a reading carriage 10 in the sub-scanning direction Ay. In other words, the barrier wall 23 also functions as a guide member (guide rail) to guide the reading carriage 10 in the sub-scanning direction, while concurrently dividing the inside of the casing into the carriage travel area Cr and the board placement area Br.

The carriage travel area Cr is formed of space (hereinafter, referred to as first housing) enclosed with the barrier wall 23, front-side external wall 1f, right-side wall 1s and left-side wall 1n, and the main platen 2 and sub-platen 3 are disposed on the top surface. The reading carriage 10 described later is disposed in the main scanning direction inside the space, and the carriage reciprocates in the sub-scanning direction inside the area.

The board placement area Br is formed of space (hereinafter, referred to as second housing) enclosed with the barrier wall 23, rear-side side wall 1r, right-side wall 1s and left-side wall 1n, and the top 5a and hinge attachment section 6 are disposed on the top surface.

Cooling air (outside air) is supplied from outside the casing to the first and second housings Cr, Br thus partitioned into two (or, two or more) portions by the barrier wall 23. Therefore, the first air vent 7 and second air vent 8 are formed in the rear-side side wall 1r of the casing 1. Then, a first blast path 30 is disposed between the first air vent 7 and the first housing (carriage travel area Cr), and a second blast path 40 is disposed between the second air vent 8 and the second housing (board placement area Br).

The main platen 2 is comprised of a transparent placement surface to set an image original document in a rest state, and the sub-platen 3 is comprised of a transparent exposure surface to read a shifting image original document fed from the feeder unit F at a constant velocity. In addition, instead of providing the sub-platen 3 particularly, it is also possible to adopt a configuration (one-platen mechanism) for reading a traveling original document with a part of the main platen The first air vent 7 and second air vent 8 are disposed in mutually adjacent positions, and the air outlet 9 is disposed in a position spaced a distance in the sub-scanning direction. Then, outside air sucked from the first air vent 7 and second air vent 8 is sent in the main scanning direction and the sub-scanning direction, and is discharged to the outside from the air outlet 9. By the flows of air, the inside of the housing is cooled.

Further, since the first air vent 7 and second air vent 8 are disposed in mutually adjacent positions, the air vents do not directly suck again the air, which is sucked from respective air vents, cools the inside of the casing, and is warmed in the inner portion to discharge to the outside, into the inside. Accordingly, both of the air vents are capable of efficiently sucking outside air.

Figure 2:
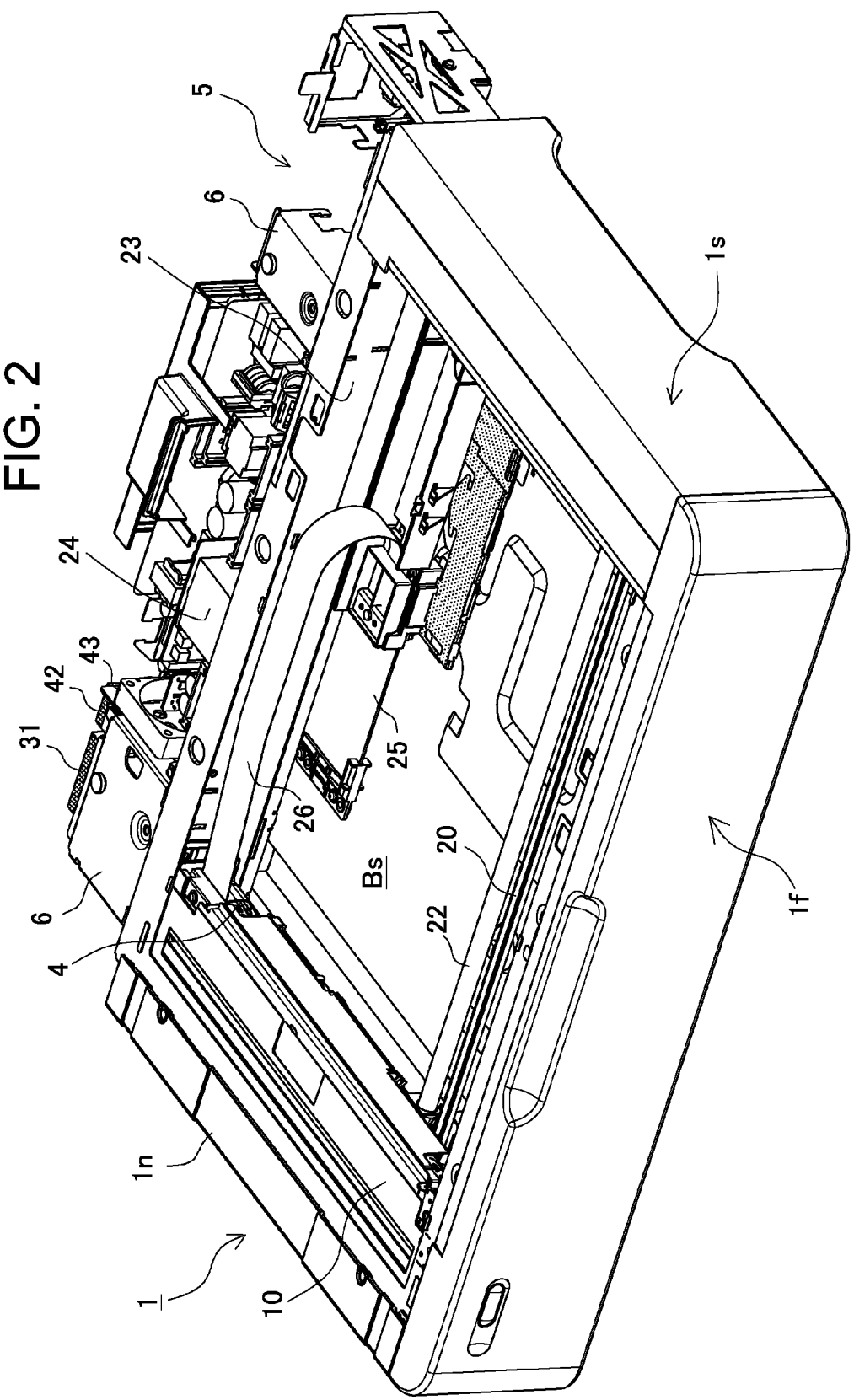
FIG. 2 is an explanatory view of principal part of the apparatus of FIG. 1.
Figure 3:
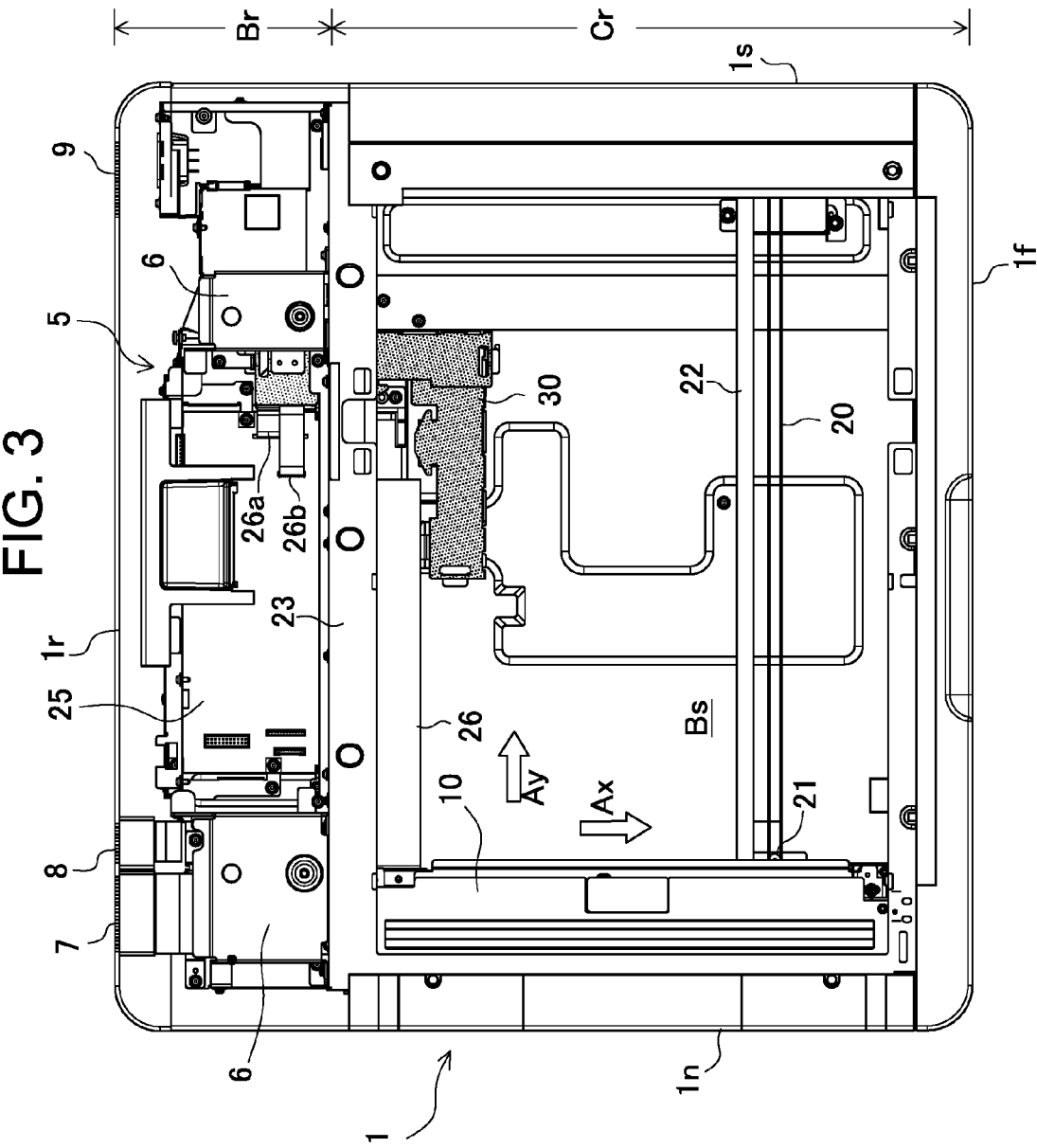
FIG. 3 is a plan view illustrating an internal layout configuration of the apparatus of FIG. 1.

FIGS. 2 and 3 illustrate a configuration of the inside of the casing. Inside the casing is incorporated an image reading mechanism 4 for reading an original document image (still image) set on the main platen 2 or a shifting original document (shifting image) traveling on the sub-platen 3 in a line sequential manner.

The image reading mechanism 4 is comprised of one of contact reading structure and reduction optical reading structure. The apparatus shown in the figure indicates the reduction optical system reading structure, and the structure will be described. The reading mechanism 4 is comprised of the reading carriage 10, light source lamps 11, reflecting mirrors 17, condenser lens 18 and photoelectric sensor 13.

The reading carriage 10 (hereinafter, referred to as "carriage") is supported to be able to shift along a pair of guide members 22 (guide rails, guide rods and the like) disposed on the front-side external wall 1f and the rear-side side wall 1r of the casing 1. The carriage 10 reciprocates along the main platen 2, while concurrently shifting to positions between the main platen 2 and the sub-platen 3.

To the reading carriage 10 is coupled a travel tow member 20 such as a timing belt and wire, and the travel tow member 20 is supported by a rotating member 21 such as a pulley and wind-up roll. To this rotating member 21 is coupled a drive motor (not shown in the figure; hereinafter, referred to as "carriage motor"). The travel tow member (timing belt 20), rotating member (pulley 21) and carriage motor (stepping motor) in the apparatus shown in the figure are incorporated into the casing 1.

Figure 4:
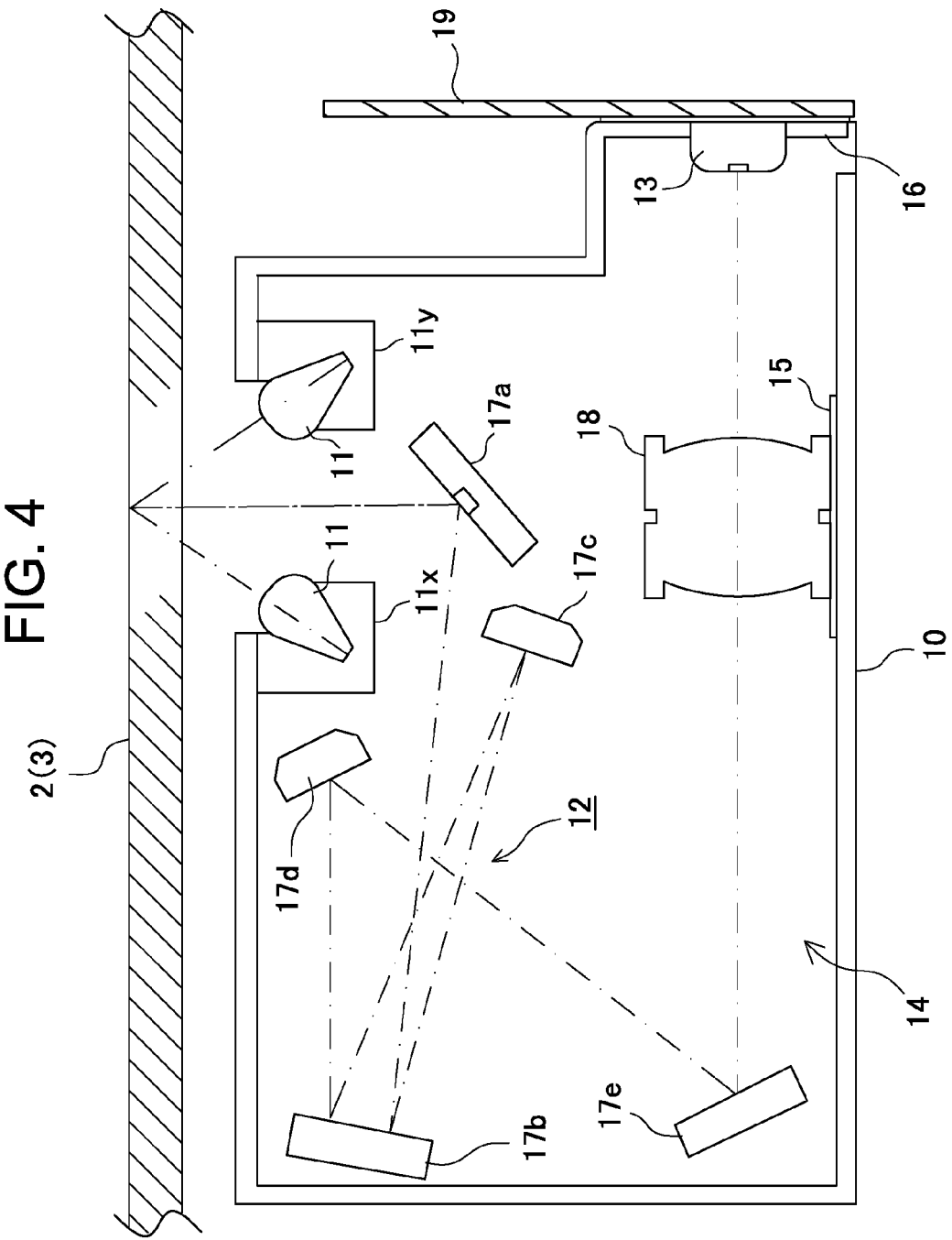
FIG. 4 is an explanatory view of internal structure of a reading carriage in the apparatus of FIG. 1.

An internal structure of the carriage 10 will be described according to FIG. 4. Into the carriage 10 are incorporated the light source lamps 11 (a pair of LED lamps in the apparatus shown in the figure), reading optical system 12, and photoelectric converter 13. The carriage 10 is made of a heat-resistant resin, and lamp placement sections 11x, 11y, mirror fix section 14, lens fix section 15 and sensor board fix section 16 are integrally formed. The rod-shaped LED lamps (light source lamps) 11 are fixed to the lamp placement sections 11x, 11y, and are disposed to apply light to the original document on the platen. To the mirror fix section 14 are fixed the reflecting mirrors 17 (17a, 17b, 17c, 17d, 17e) having predetermined lengths in the main scanning direction.

Each of the mirrors 17a to 17e reflects reflected light such that the light from the light source lamps 11 is applied to the original document image, and forms an imaging optical path with a predetermined length. In the lens fix section 15, the lens 18 (image formation lens) that condenses output light from the reflecting mirror 17 is attached to be adjustable in position. Further, a sensor board 19 is attached to the sensor board fix section 16, and the photoelectric sensor 13 (photoelectric converter; CCD) is mounted on the board and is disposed so that the light from the condenser lens 18 forms an image on the photoelectric sensor (line sensor) 13.

The light source lamps 11, imaging optical system 12 and photoelectric sensor 13 are arranged in the shape of a line so as to read the original document image in a line sequential manner. In other words, the photoelectric sensor 13 is a line sensor (CCD or the like), and the condenser lens 18 forms a line image on the line sensor. Therefore, the reflecting mirrors 17 and light source lamps 11 are configured to emit and reflect line light. Then, the carriage 10 shifts in the sub-scanning direction orthogonal to the main scanning direction of the photoelectric sensor (sensor alley) 13.

In addition, the Embodiment is described in which the photoelectric sensor 13 and condenser lens 18 are mounted on the carriage 10, and it is also possible to fix the imaging optical system to the bottom portion of the casing, for example, chassis. In this case, a transmission cable 26 described later is comprised of a power supply line 26a and control line 26b thereof.

[Board Structure]

The board storage section 5 is disposed inside the casing 1. The casing 1 shown in the figure is provided with the barrier wall 23 to partition the inside of the box-shaped casing into the carriage travel area (first housing) Cr and the board placement area (second housing) Br. The board storage section 5 is comprised of space enclosed with the barrier wall 23, the rear-side wall surface 1r, top 5a and bottom plate (chassis) Bs.

Further, in the carriage travel area (first housing) Cr partitioned by the barrier wall 23 is formed space enclosed with the barrier wall 23, front-side external wall 1f, main platen 2, and bottom plate (chassis) Bs. Thus, by the barrier wall 23 are formed an air flow (sub-scanning direction blast path 40) to send air to the board placement area Br and an air flow (main scanning direction blast path 30) to send air to the carriage travel area Cr.

In the board storage section 5 are disposed a plurality of boards 24, 25 such as a power supply board 24 to supply power to the light source lamps 11 stored in the carriage 10, a control board 25 to control the carriage motor and control reading of the photoelectric sensor 13 of the sensor board 19, and an image processing board (the board shown in the figure is integrally formed on the board 25) to process data from the sensor board 19 mounted on the carriage 10.

The power supply board 24 supplies power to a configuration unit required for image reading. Therefore, although not shown in the figure, the board is provided with an input power supply terminal and output power supply terminal. Then, on the board are mounted relatively tall lead insertion type (THD: Through Hole Mount Device) circuit devices such as a transformer, capacitor, transistor and diode. Various kinds of power supply from the output terminal are supplied to electric devices via the control board 25 described later. In the apparatus shown in the figure, the power supply board 24 supplies power to the light source lamps 11 mounted on the carriage 10 and carriage motor (not shown).

The control board 25 transmits a control signal required for image reading to the circuit devices. Concurrently therewith, the board 25 issues a signal to control image reading in the photoelectric sensor 13. Further, the board 25 receives an output signal from the photoelectric sensor 13. An image reading signal transferred from the photoelectric sensor 13 is provided with digital signal conversion and output data correction in a processing circuit disposed on the control board 25, and is transferred to outside the apparatus via an interface circuit.

[Board Layout Structure]

Figure 6:
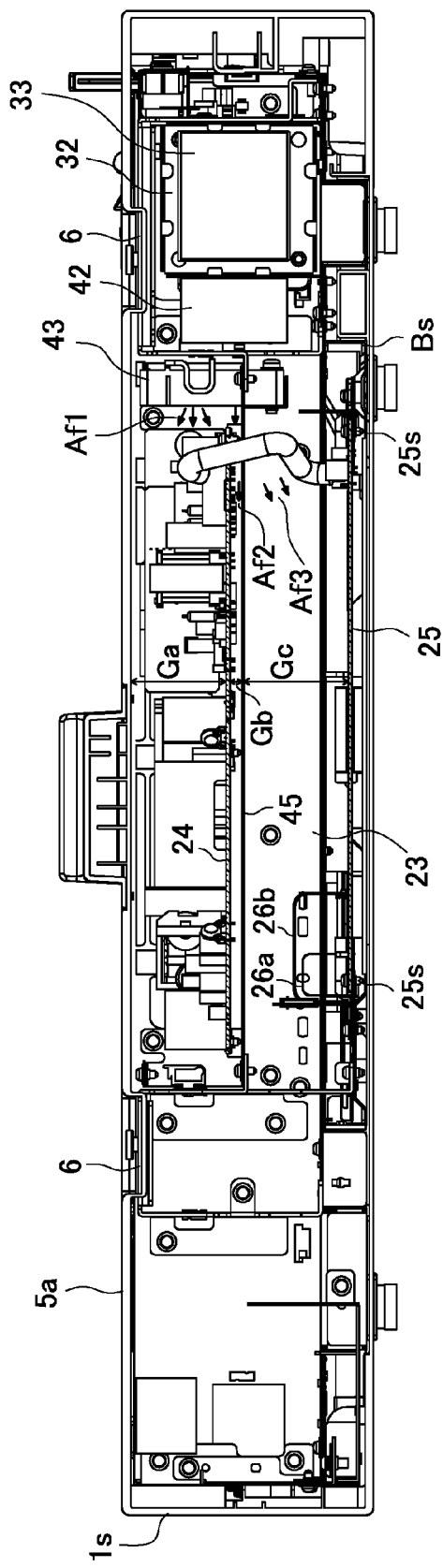
FIG. 6 is an explanatory view of a cooling mechanism of circuit boards in the apparatus of FIG. 1.

As shown in FIG. 3, the power supply board 24 and control board 25 are attached to the board placement area Br of the board storage section 5 inside the casing 1. The attachment structure will be described according to FIGS. 6 and 7. The board storage section 5 is housing-formed as the board placement area Br inside the casing 1. This housing (second housing Br) is comprised of the area enclosed with the top 5a, bottom plate Bs, barrier wall 23 and the side wall 1r on the rear side.

On the other hand, the circuit boards are comprised of different separate boards, power supply board 24 and control board 25. Then, both of the boards 24, 25 are disposed at a distance vertically in the layered state, the power supply board 24 is disposed in the upper portion, and the control board 25 is disposed in the lower portion.

The control board 25 (hereinafter, referred to as first board) in the lower portion is fixed to an installation foot portion 25s (first board support member) formed on the bottom plate Bs of the casing 1. Further, the power supply board 24 (hereinafter, referred to as second board) in the upper portion is fixed at its one end portion to a bracket 44 fixed to a casing side wall, while being fixed at its other end to an installation foot portion 24s (second board support member) formed in a casing wall portion.

Figure 8:
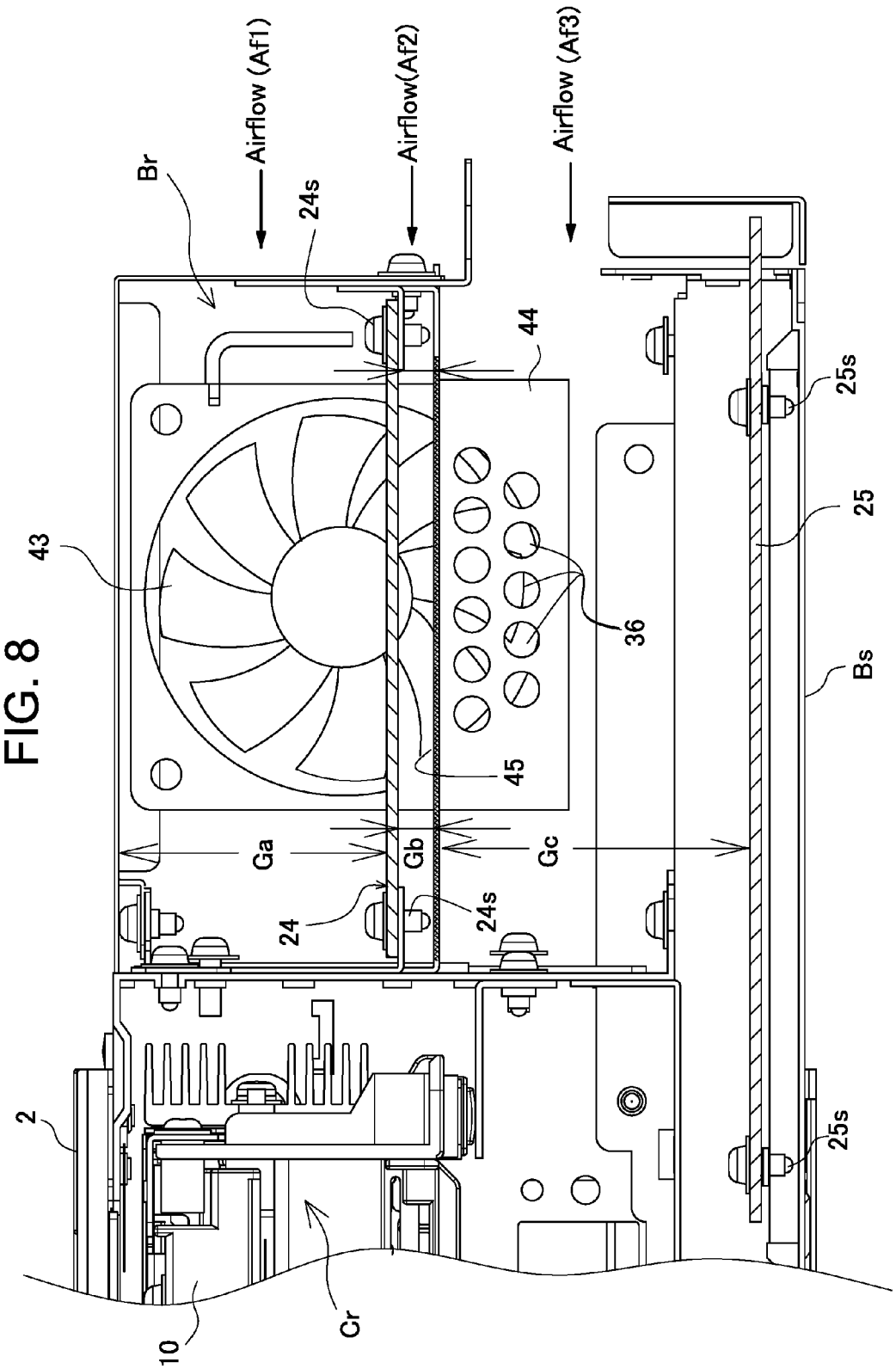
FIG. 8 is an explanatory view of the arrow direction of FIG. 7.

At this point, in a state in which a second blast fan 43 is attached, the bracket 44 is provided with air vents 36 so that an air blast from the fan is sent to between the first board 24 and a partition plate 45 (see FIG. 8). In FIG. 8, the air vent is shown by a circular shape, and such a shape may also be adopted that attachment portions at opposite ends of the second blast fan 43 to attach the second blast fan 43 to the bracket 44 are left, and that an opening is formed between the portions. Then, the partition plate 45 is disposed between the first board 24 and the second board 25 to partition vertically. The partition plate 45 is formed of a material (for example, metal plate) with thermal conductivity higher than that of the circuit boards (first board and second board).

In between the first board 24 and the second board 25, a gap Ga between the top 5a and the first board 24 is formed to be wider than a gap Gb between the first board 24 and the partition plate 45 and a gap Gc between the partition plate 45 and the second board 25. Further, the gap Gc is formed to be wider than the gap Gb. Accordingly, the gap Ga is formed in the relationship of gap Ga>gap Gc>gap Gb.

Then, the second blast path 40 and second blast fan 43 are disposed at end portions of the first board 24 disposed in the upper portion and the second board 25. In the outside air sent from the second blast fan 43, a first air flow Af1 (first blast path) is formed between the top 5a and the first board frontside, a second air flow Af2 (second blast path) is formed between the first board backside and the partition plate 45, and a third air flow Af3 (third blast path) is formed between the partition plate backside and the second board frontside. Then, the air from each path is released to the outside from the air outlet 9.

Figure 7:
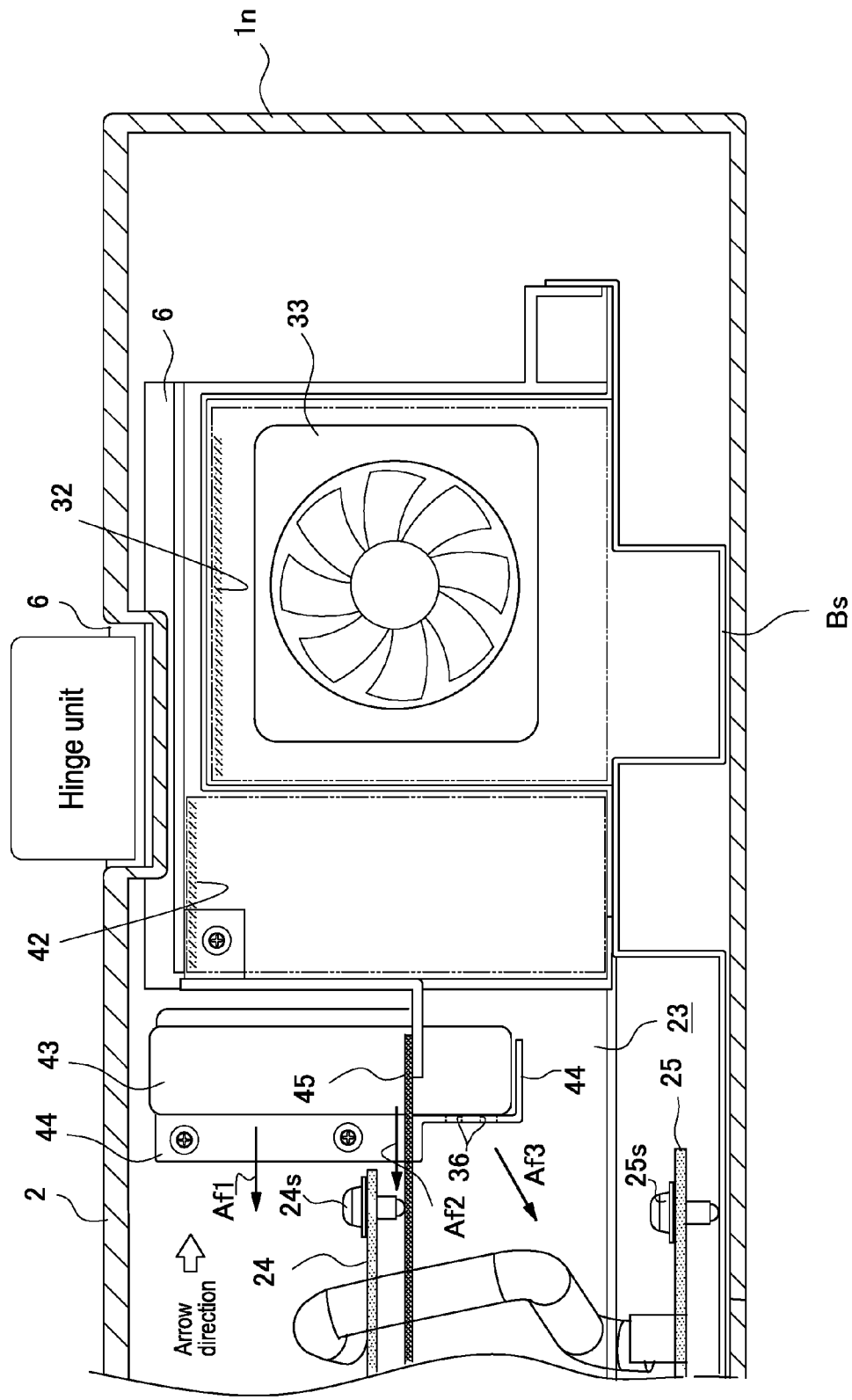
FIG. 7 is an explanatory view of cooling air flows of the circuit boards in the apparatus of FIG. 1.

It is set that an air volume of the first air flow Af1 is higher than an air volume of the second air flow Af2, and that an air volume of the third air flow Af3 is lower than the air volume of the first air flow Af1 and is higher than the air volume of the second air flow Af2 (see FIG. 7). The air volume adjustments in this case are made with an area ratio of air flow directions from the blast fan 43 toward the gap Ga, Gap Gb and gap Gc.

In such a configuration, the first air flow Af1 sends heat generated from the first board frontside in the direction from the air vent 8 to the air outlet 9. Concurrently therewith, the heat of the first board frontside undergoes convection inside the gap Ga (space with the wide gap). Further, the second air flow Af2 is sent smoothly to the air outlet 9 as a laminar flow without being a turbulent flow between the first board backside and the partition plate 45.

In other words, since lead insertion type parts such as a transformer, capacitor and IC chip which are relatively tall parts are arranged on the board frontside, a turbulent flow is made and heat is disrupted. In contrast thereto, since relatively short surface package type parts are packaged on the board backside, the air sent from the second blast fan 43 maintains a state of the laminar flow, and discharges heat of the board smoothly from the air outlet 9.

[Transmission Cable]

The transmission cable 26 connects between the carriage 10 and the control board 25. The transmission cable 26 is comprised of a flat cable formed of a power supply line 26a to supply power to the light source lamps 11, and a plurality of control lines 26b such as a data line to transmit image data read with the photoelectric sensor 13, and control data lines to control lamp flashing and photoelectric conversion. The transmission cable 26 shown in the figure is formed of a flexible cable that becomes deformed in association with a shift of the carriage 10.

[Cooling Mechanism]

A cooling mechanism inside the casing 1 will be described with reference to FIG. 5. As described according to FIG. 3, the first blast path 30 is formed between the first air vent 7 and the carriage travel area (first housing) Cr formed in the casing 1, and the second blast path 40 is formed between the second air vent 8 and the board placement area (second housing) Br.

The air vents 7 and 8 described previously are disposed in the rear-side side wall 1r (or, front-side external wall 1f, right-side wall 1s, left-side wall 1n) of the casing 1 close to a home position of the carriage 10. In other words, the first air vent 7 is disposed in a reading start position Hp of the carriage 10 for performing scanning operation, and the first blast path 30 is disposed in the main scanning direction (Ax direction in FIG. 3) so that cooling air is sent from the air vent 7 to the carriage 10 at rest. Further, the cooling air sent from the first blast path 30 is sent to the entire carriage travel area (first housing) Cr.

The first blast path 30 is comprised of a filter cover 31 coupled to the first air vent 7, a first air filter 32 stored in the cover, and a vent (not shown) of the barrier wall 23. In other words, the path is comprised of a path for guiding outside air from the first air vent 7 to the carriage travel area (first housing) Cr through the first air filter 32.

The filter cover 31 is integrally formed, while protruding from the inner wall of the rear-side side wall 1r inwardly in the shape of a hood, and incorporates the first air filter 32 thereinto. The air filter 32 is made of (porous material such as, for example, polyurethane resin and polyester resin), and a collection amount η1 of dust thereof is obtained by the following equation.

$$\eta = (1 - Wp/Wf) \times 100 \, [\%] \quad \text{(Eq. 1)}$$

η: Collection efficiency; Wf: Amount of supplied dust [g]; Amount of dust collected with the filter [g]

Figure 5:
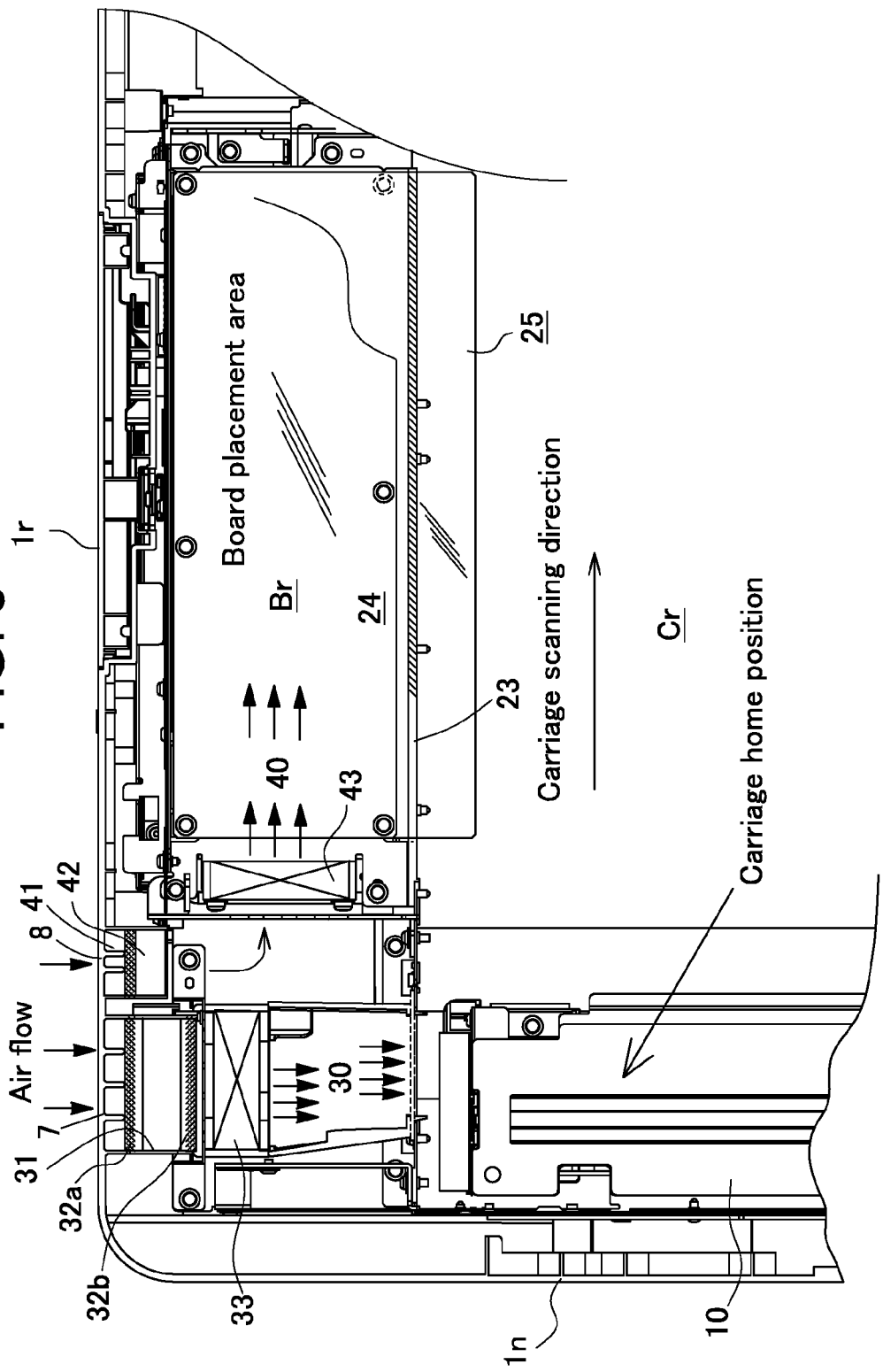
FIG. 5 is an explanatory view of principal part, while being an explanatory view of blast paths in the apparatus of FIG. 1.

As shown in FIG. 5, the filter cover 31, and next, the first blast fan 33 are arranged in the main scanning direction from the rear-side side wall 1r. The first air filter 32 (in the filter shown in the figure, filter 32a and filter 32b) is incorporated into the filter cover 31. In the first blast fan 33, the fan is attached to a rotating shaft bearing-supported on a unit frame, and the rotating shaft is equipped with a fan motor (not shown) provided with a reduction mechanism.

The structure of the first air filter 32 is comprised of a three-layer structure having an air layer between the filters 32a and 32b. Then, the collection efficiency (η1) obtained by the above-mentioned (Eq. 1) is set at a value higher (larger) than that of a second air filter 42 of the second blast path 40, described later.

The second blast path 40 is comprised of a filter cover 41 coupled to the second air vent 8, and the second air filter 42 stored in the cover. Then, the path is comprised of a path for guiding outside air from the second air vent 8 in the sub-scanning direction through the second air filter 42. The second blast fan 43 is disposed in the second blast path 40, and in the blast fan 43, the fan is attached to a rotating shaft bearing-supported on the unit frame, and the rotating shaft is equipped with a fan motor (not shown) provided with a reduction mechanism.

The second blast fan 43 blows air in the sub-scanning direction (Ay), and sends cooling air to the board placement area (second housing) Br. The collection efficiency (η2) of the second air filter 42 is obtained by (Eq. 1) as described previously, and the collection efficiency (η1) of the first air filter 32 and the collection efficiency (η2) of the second air filter 42 are set at [η1>η2].

For collection efficiencies of the first and second filters 32 and 42, "mesh roughness" is configured to be dense, or the effective filtering volume is set to be high. In the filters shown in the figure, the mesh roughness and filter volume of the first air filter 32 is set to be higher than in the second air filter 42. In other words, the first air filter 32 is comprised of two filters with the mesh roughness being dense. In contrast thereto, the second air filter 42 is comprised of a single filter with the mesh roughness being rough.

[Blast Volume Regulation]

The first air vent 7 and second air vent 8 are comprised of apertures for regulating a volume of air introduced to inside the casing 1. A plurality of vent holes 7a in the shape of a grill is formed in the rear-side side wall 1r of the casing 1, and as the total area (Area) of the vent holes, the first air vent 7 is set for an area larger than that of the second air vent 8 (Area 7>Arear 8).

Then, a blast volume by the first air vent 7 and first blast fan 33 is set to be higher than a blast volume by the second air vent 8 and second blast fan 43. For example, when the area of vent holes of the first air vent 7 is a times the area of vent holes of the second air vent 8, the air volume of the first blast path 30 is a times the air volume of the second blast path 40 (in this case, the capacity of the blast fan is not considered).

From the above-mentioned configuration, the cooling air sent from the first blast path 30 to the carriage travel area (first housing) Cr is higher in the clean degree and concurrently higher in the air volume than those of the cooling air of the second blast path 40. In contrast thereto, the cooling air of the second blast path 40 sent to the board placement area (second housing) Br is lower in the clean degree and smaller in the air volume than those of the cooling air of the first blast path 30.

Accordingly, even when the light source lamps 11 mounted on the carriage 10 become high temperatures, the lamps are cooled by an air volume of high capacity, and concurrently, it is possible to reduce the dust amount adhering to imaging optical parts such as the mirrors 17 and condenser lens 18 mounted on the carriage 10. On the other hand, for the circuit boards (power supply board, control board and the like) with relatively low heating values as compared with the light source lamp and the like, the air volume is set to be low, the clean degree is also set to be low, and therefore, it is possible to reduce the load of the fan motor required for sending air.

This application claims priority from Japanese Patent Application No. 2014-262018 filed on Dec. 25, 2014 in Japan incorporated herein by reference.

The invention claimed is:

1. A blast mechanism in an image reading apparatus for sending cooling air to inside a casing of the apparatus for reading an image in a line sequential manner, comprising:
   the casing;
   a first blast path in a main scanning direction formed inside the casing;
   a second blast path in a sub-scanning direction formed inside the casing; and
   air filters disposed in respective blast paths, wherein dust collection efficiencies of the air filters are set so that the filter of the first blast path is higher than the filter of the second blast path.

2. The blast mechanism in an image reading apparatus according to claim 1, wherein the air filter of the first blast path is set for denser mesh roughness or a higher filtering volume than in the air filter of the second blast path.

3. The blast mechanism in an image reading apparatus according to claim 1, wherein a regulation aperture for a blast volume is provided in each of the first blast path and the second blast path, and the regulation aperture of the first blast path is set for a higher blast volume than in the regulation aperture of the second blast path.

4. The blast mechanism in an image reading apparatus according to claim 1, wherein a common blast fan or individual blast fans are disposed in the first blast path and the second blast path.

5. A blast mechanism in an image reading apparatus for sending cooling air to inside a casing of the apparatus for reading an image in a line sequential manner, comprising:
the casing having a reading travel area and a board placement area; a first blast path adapted to send air in a main scanning direction from an air inlet formed in an external wall of the casing; a second blast path adapted to send air in a sub-scanning direction from an air inlet formed in an external wall of the casing; and air filters disposed in respective blast paths, wherein each area is disposed inside the casing so that cooling air is sent from the first blast path to the reading travel area, and that cooling air is sent from the second blast path to the board placement area, and dust collection efficiencies of the air filters are set so that the filter of the first blast path is higher than the filter of the second blast path.

6. The blast mechanism in an image reading apparatus according to claim 5, wherein in the reading travel area is disposed a reading carriage movable in the sub-scanning direction, and
on the reading carriage are mounted a light source, a reflecting mirror and a condenser lens.

7. The blast mechanism in an image reading apparatus according to claim 5, wherein in the board placement area is disposed a control board for controlling a light source lamp of the reading carriage.

8. The blast mechanism in an image reading apparatus according to claim 3, wherein a regulation aperture of the first blast path and a regulation aperture of the second blast path are disposed to be adjacent to each other in a wall surface of the casing.

9. An image reading apparatus provided with the blast mechanism according to claim 1, comprising:
the casing;
a platen;
an open/close unit adapted to cover the platen; and
a hinge unit of the open/close unit disposed in the casing, wherein a part of the first blast path is comprised of an air vent formed in an attachment member of the hinge unit.

10. The image reading apparatus according to claim 9, wherein the open/close unit is a feeder apparatus for feeding an original document sheet as a reading document to the platen, and
an attachment section of the hinge unit is comprised of a bracket member attached to the casing.

* * * * *